(12) United States Patent
Bechen et al.

(10) Patent No.: US 10,723,059 B2
(45) Date of Patent: Jul. 28, 2020

(54) MOLDING UNIT EQUIPPED WITH A MOVABLE BOXING INSERT VENTILATED BY A FLUID CIRCUIT TAPPED FROM THE BOXING FLUID CIRCUIT

(71) Applicant: SIDEL PARTICIPATIONS, Octeville-sur-Mer (FR)

(72) Inventors: Régis Bechen, Octeville-sur-Mer (FR); Camille Guiton, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 16/448,977

(22) Filed: Jun. 21, 2019

(65) Prior Publication Data

US 2019/0389119 A1    Dec. 26, 2019

(30) Foreign Application Priority Data

Jun. 21, 2018 (FR) ...................... 18 55473

(51) Int. Cl.
| | | |
|---|---|---|
| *B29C 49/48* | (2006.01) | |
| *B29K 67/00* | (2006.01) | |
| *B29L 31/00* | (2006.01) | |

(52) U.S. Cl.
CPC ...... *B29C 49/482* (2013.01); *B29K 2067/003* (2013.01); *B29L 2031/7158* (2013.01)

(58) Field of Classification Search
CPC .......... B29C 49/482; B29C 2049/4828; B29C 2049/4807
See application file for complete search history.

(56) References Cited

U.S. PATENT DOCUMENTS

| 8,348,658 B2 | 1/2013 | Dagorn |
|---|---|---|
| 2010/0104681 A1 | 4/2010 | Dagorn |
| 2018/0022010 A1 | 1/2018 | Leroux |

FOREIGN PATENT DOCUMENTS

| EP | 2106898 | 10/2009 |
|---|---|---|
| EP | 2 344 320 | 7/2011 |
| EP | 2 379 304 | 10/2011 |
| EP | 3272495 | 1/2018 |
| FR | 2 939 070 | 6/2010 |
| WO | WO 2015/150648 | 10/2015 |

OTHER PUBLICATIONS

French Search Report, FR 1855473, dated Mar. 12, 2019.

*Primary Examiner* — Robert B Davis

(57) ABSTRACT

A Molding unit for the forming of a container includes: a mold provided with a side wall defining a cavity bearing the impression of a portion of the container; an insert having a frontal surface bearing the impression of a local portion of the container, movable between a retracted position and a deployed position, with this insert being penetrated by ducts; a pierced piston to which the insert is attached and which ensures the mobility of the latter between its retracted position and its deployed position; and at least one pierced screw by which the insert is attached to the piston.

20 Claims, 6 Drawing Sheets

MOLDING UNIT EQUIPPED WITH A MOVABLE BOXING INSERT VENTILATED BY A FLUID CIRCUIT TAPPED FROM THE BOXING FLUID CIRCUIT

BACKGROUND OF THE INVENTION

Field of the Invention

The invention relates to the forming of containers, in particular bottles, flasks, or else jugs, from blanks made of thermoplastic material (such as polyethylene terephthalate or PET), and more particularly to containers provided with hollow recesses such as integrated handles.

Description of the Related Art

Let us recall that the manufacture of containers generally comprises a blow-molding operation that takes place in a mold whose wall defines a cavity within which the blank is inserted, the latter, during blow molding, conforming to the wall under the action of the high gas pressure that prevails in the blank, previously heated to a temperature that exceeds the glass transition temperature of the material (which is approximately 80° C. in the case of PET) in such a way as to enable its plastic deformation.

When it is inserted into the mold, a blank made of PET is typically at a temperature from approximately 120° C. to 140° C. The blow molding is fast; when it reaches the wall of the mold, the blank is still at a temperature of approximately 100° C.

With the blow-molding cycle, of a duration on the order of 1.5 s, being repeated thousands of times, the successive contacts of blanks against the wall of the mold would bring the latter to a permanent temperature of approximately 100° C. if the wall was not thermally regulated by means of an internal cooling circuit.

Actually, it is known to regulate a mold thermally by means of a fluid circuit comprising ducts that penetrate into the wall of the mold, in which a coolant circulates (cf., for example, the European patent EP2106898 (Sidel)).

Some containers can be provided with recesses formed as cavities toward the interior of the container and made with an esthetic purpose (for example, creating curves) or with a functional purpose (making a handle for grasping the container).

To achieve this, a molding unit is generally used that is provided with a movable insert that is initially retracted into the wall of the mold and that is deployed in the presence of the container being formed in the mold to push the material back when it reaches the wall, as illustrated in the European patent application EP3272495 or its U.S. equivalent US2018022010 (Sidel Participations).

A problem posed by this structure is that the inserts, in repeated contact with the material of the blank, have a tendency to heat until reaching temperatures on the order of 100° C. Thus, the part of the blank that comes into contact with the insert is not cooled and remains at a temperature that exceeds the glass transition temperature. In the area of contact with the insert, the material of the blank therefore remains malleable and does not have time to cool enough and to set before the container is degassed, which consists in evacuating the blow-molding air before initiating its removal from the forming mold. The result is that at the end of the degassing, in these areas of the container that are still hot, the material can deform by undergoing a retracting phenomenon (also called "shrinkage"), in such a way that ultimately, the final shape of the container does not correspond to the desired shape.

It therefore appears necessary to cool the insert.

In the past, solutions for cooling the insert were proposed, cf., for example, the European patent EP2344320 (Sidel) that describes a cooling circuit including ducts made in the insert and in which there circulates a coolant that is brought in via rods on which the insert is mounted, with these rods themselves being attached to a plate that carries connectors to which flexible pipes for intake and evacuation of coolant are connected.

This structure is bulky; it is adapted to a linear-type mold, in which the wall is subdivided into two half-molds mounted in translation in relation to one another, but it is not suitable for a portfolio-type mold, in which space is counted. In particular, in practice, it is impossible to insert hoses between the mold and its support, through which hoses the coolant intended to supply the inserts would be brought.

In addition, this structure makes it necessary to create a complex circuit for supplying coolant to the insert, which circuit comprises its own solenoid valves.

There is thus still a need to propose a solution that is suitable in particular for portfolio-type molds and that makes it possible to simplify the supplying of a coolant to movable inserts.

SUMMARY OF THE INVENTION

For this purpose, a molding unit is proposed for the forming of a container, with this forming unit comprising:
  A mold provided with a side wall defining a cavity bearing the impression of a portion of the container;
  An insert having a frontal surface bearing the impression of a local portion of the container, movable between a retracted position and a deployed position, with this insert being penetrated by ducts;
  A piston to which the insert is attached and which ensures the mobility of the latter between its retracted position and its deployed position, with this piston itself being mounted in translation in a recess hollowed into the side wall, with the piston defining a primary fluid chamber located beside the piston that is opposite to the insert and into which at least one pipe for intake of a pressurized fluid, made in the side wall, empties;
  At least one screw by which the insert is attached to the piston.

In this molding unit, the ducts of the insert are in fluid communication with the primary chamber by means of a fluid circuit that comprises at least a first section made in the screw and that communicates with the ducts of the insert, and a second section made in the piston, which communicates with the first section.

Various additional characteristics can be provided, by themselves or in combination:
  The screw for attaching the insert is penetrated by a central bore that passes right through it and forms the first section of the fluid circuit.
  The piston is provided with at least one projecting gun, on which the insert is attached by the screw, this gun being hollow and comprising a central well that forms the second section of the fluid circuit.
  The molding unit comprises at least one fixed rod for guiding the piston, on which the latter is mounted to slide.

The fluid circuit comprises a third section made in the guide rod, which communicates with the second section.

The third section of the fluid circuit comprises a central bore made in the guide rod, and radial holes that open, on the one hand, into the primary chamber and, on the other hand, into the central bore.

The guide rod is fitted into the gun, with its central bore opening into the central well of the latter.

The guide rod is mounted on a connected sleeve fitted into the recess, in which the piston is mounted in translation, and with which the piston defines the primary chamber.

The ducts open onto a rear surface of the insert, rotated on the side of the piston.

The insert comprises a number of ducts that diverge from a common vertex and are distributed along a cone.

BRIEF DESCRIPTION OF THE DRAWINGS

Other objects and advantages of the invention will be brought out in the description of an embodiment, given below with reference to the accompanying drawings in which.

DESCRIPTION OF THE PREFERRED EMBODIMENTS

Figure 1:
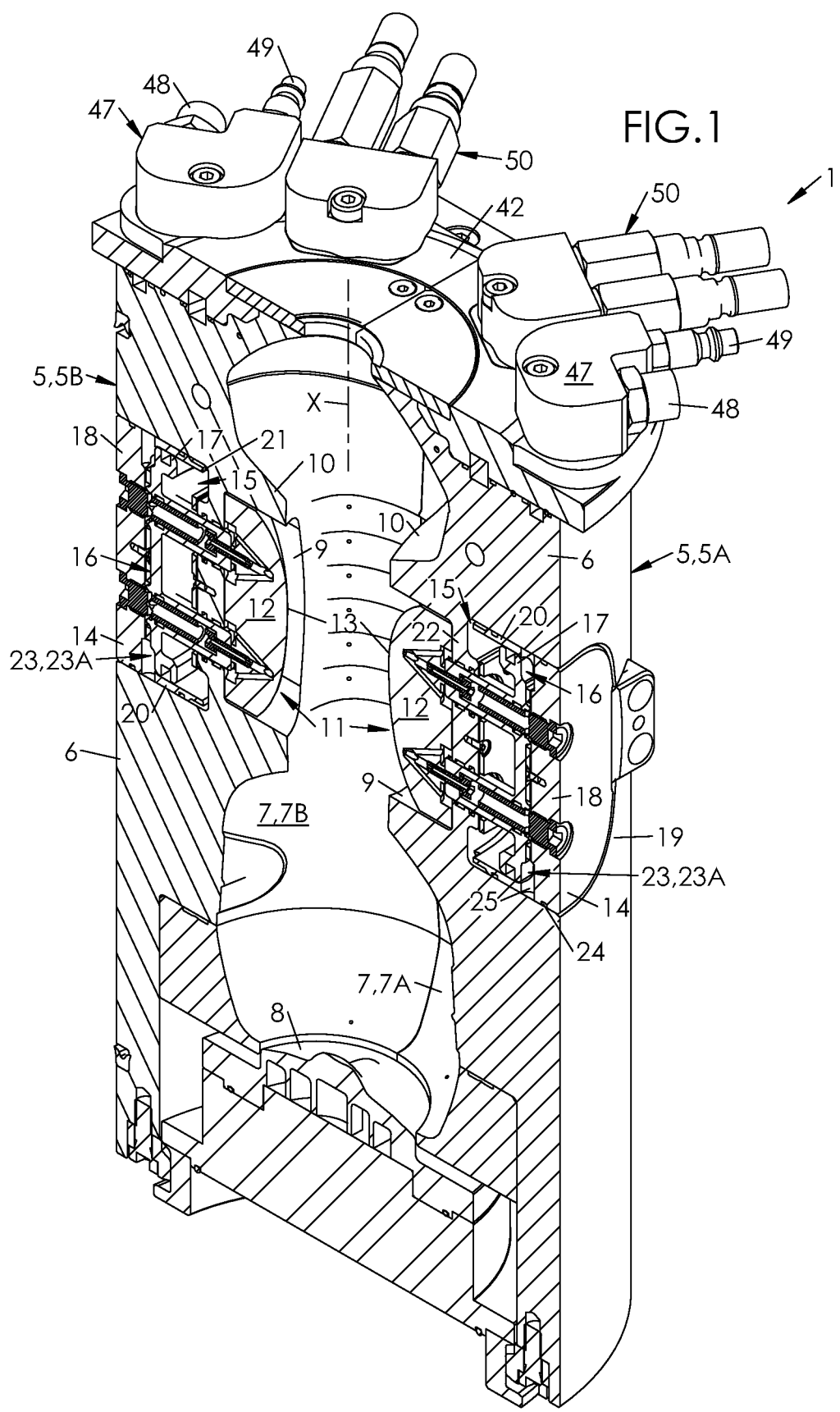
FIG. 1 is a cutaway view in perspective of a molding unit for the forming of containers by blow molding.
Figure 7:
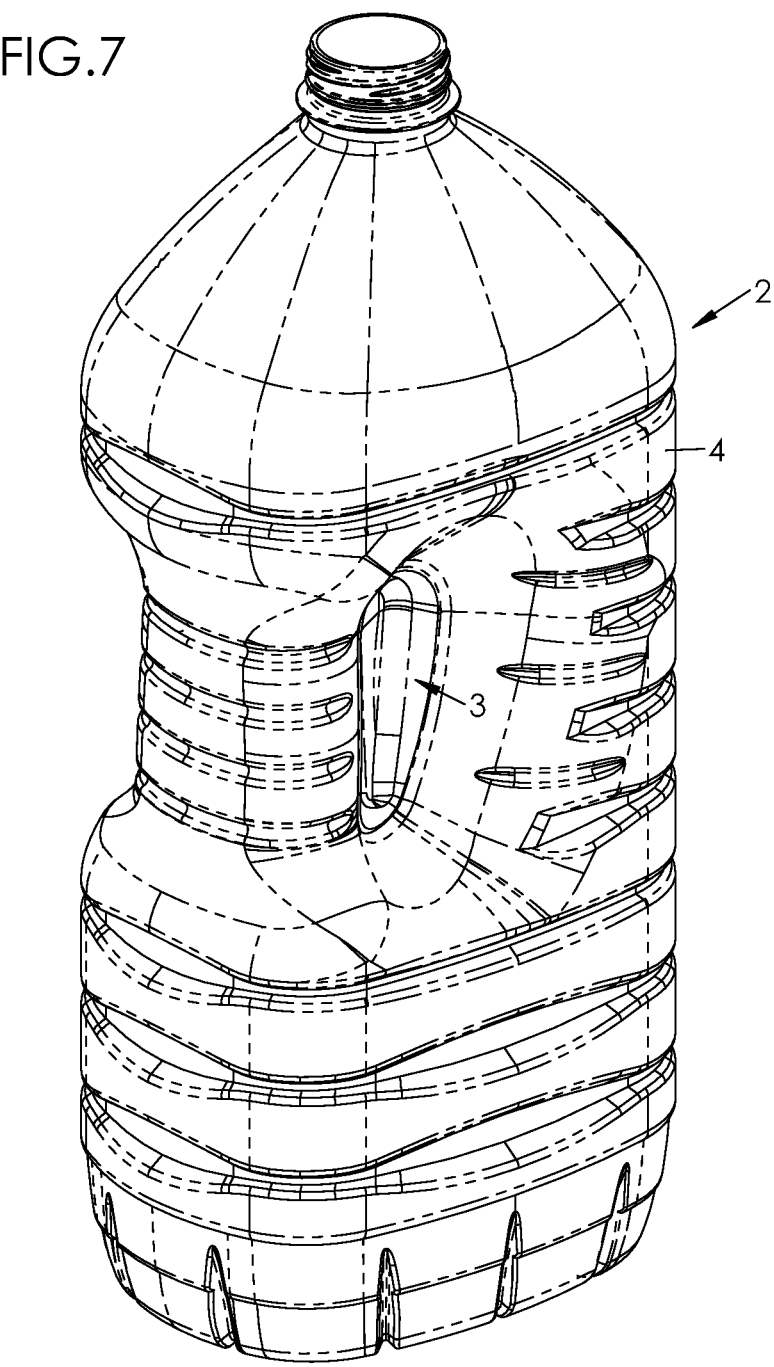
FIG. 7 is a perspective view of a container formed in a molding unit as illustrated in the preceding figures.

In cutaway and in perspective, FIG. 1 shows a molding unit 1 for the forming, from a blank (typically a preform), of a container 2, such as a bottle or a jug, as illustrated in FIG. 7, provided with a recess 3 formed as a cavity toward the interior of the container 2. The container 2 is provided, in a conventional manner, with a body 4, a bottom and a neck that opens opposite the bottom. In the example illustrated in FIG. 3 and FIG. 4, the hollow recess 3 is a handle formed in the body 4 of the container to make it easy to grasp.

The molding unit 1 comprises, firstly, a mold 5 provided with a side wall 6 that defines a cavity 7 bearing the impression of a portion of the container 2. In this case, the cavity 7 has the impression of the body 4 of the container 2, the mold 5 further comprising a bottom 8 bearing the impression of the bottom of the container 2. The mold 5 is made of metal, for example steel or aluminum (this term also covering the aluminum alloys). The cavity 7 (and therefore the container 2) extends along a main axis X that defines a vertical direction. Any plane perpendicular to the main axis X is said to be horizontal.

According to an embodiment illustrated in the drawings, the side wall 6 comprises two half-molds 5A, 5B, each defining a half-impression 7A, 7B of the body 4 of the container 2 and mounted in rotation in relation to one another around a common axis formed by a hinge, between:

An open position, in which the half-molds 5A, 5B are angularly separated from one another, and the mold bottom 8 is reduced relative to the half-molds 5A, 5B to make possible the insertion of the blank and the removal of the formed container 2, A closed position, in which the half-molds 5A, 5B are applied against one another and enclose between them the mold bottom 8 (which is illustrated in FIG. 1), thus to form the cavity 7 and to define the impression of the container 2 to be formed.

The side wall 6 is provided with a housing 9 that opens into the cavity 7. This housing 9 is formed as a cavity in a protrusion 10 that forms a projection toward the interior of the cavity 7 and that forms a portion of the counter-impression of the hollow recess 3 that defines the handle.

Figure 2:
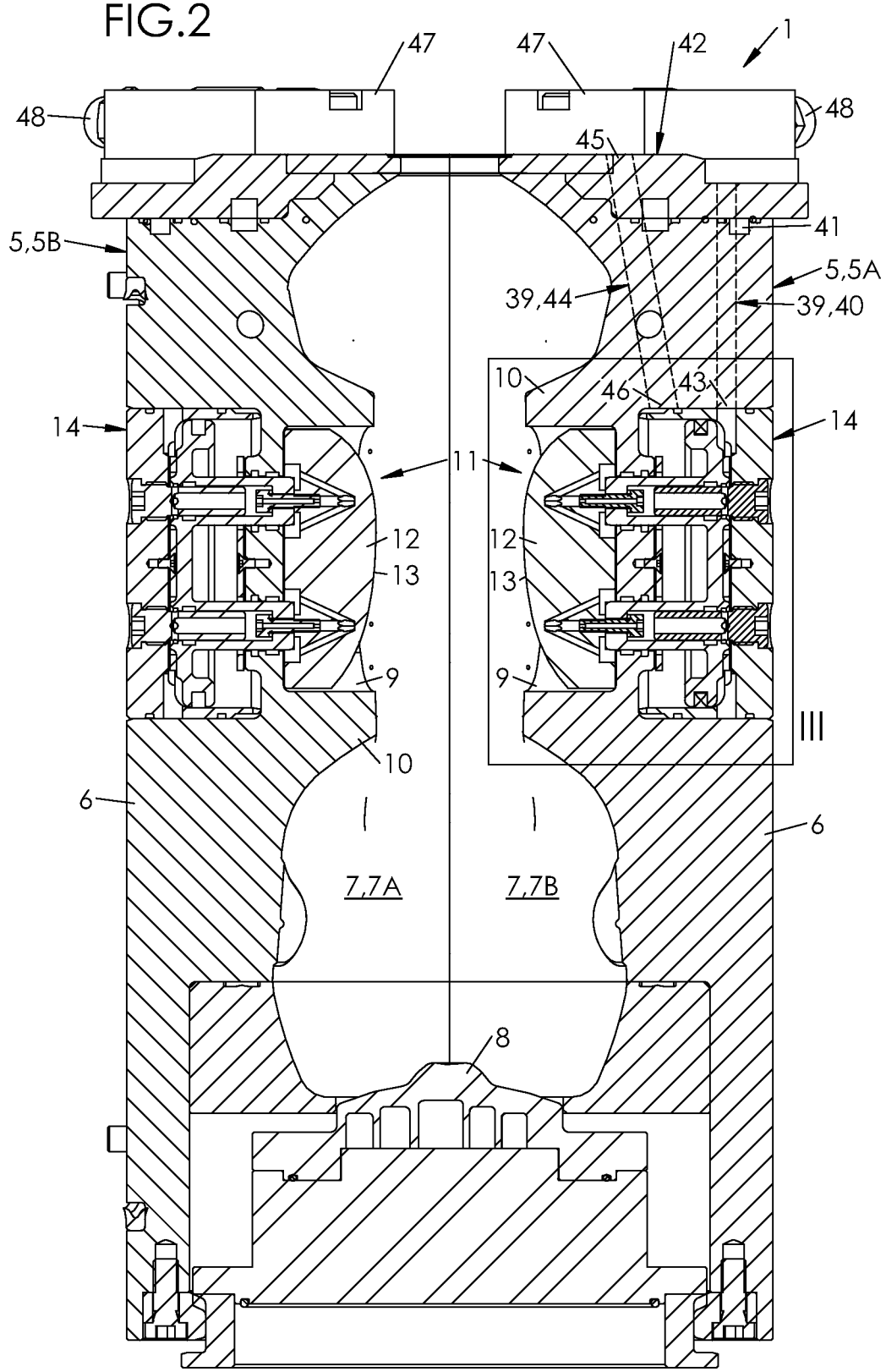
FIG. 2 is a cutaway view of the molding unit, which is equipped with a pair of movable inserts making it possible to create a handle in the container during its forming.

According to an embodiment illustrated in particular in FIG. 1 and FIG. 2, corresponding to a container 2 provided with two hollow recesses 3, preferably symmetrical in relation to a general central plane of symmetry of the container 2 and together forming the handle (such as the container 2 of FIG. 7), a housing 9 is made in each half-mold 5A, 5B. More specifically, each housing opens into the half-impression 7A, 7B of the respective half-mold 5A, 5B and is formed as a cavity in a protrusion 10 that is provided as a projection toward the interior of the cavity 7 in the respective half-mold 5A, 5B.

Secondly, and for each housing 9, the molding unit 1 comprises a boxing device 11. The term "boxing" refers to a technique for local shaping of the material by pushing back by means of a movable part, carried out during the forming of the container 2 (and more specifically initiated between the pre-blow molding and the blow molding of the container 2).

Each boxing device 11 comprises an insert 12, with a complementary shape of a housing 9 and accommodated in the latter. Each insert 12 has a frontal surface 13 bearing the impression of a local portion (i.e., of relatively small surface area) of the container 2, and more specifically of the bottom of the hollow recess 3. The frontal surface 13 is intended to push back the material of the container 2 to complete the impression of the hollow recess 3, as will be explained below. The insert 12 is advantageously made of aluminum.

As FIG. 1 and FIG. 2 show, the molding unit 1 is equipped with a pair of boxing devices 11 (preferably symmetrical) whose inserts 12 are placed opposite one another.

Each insert 12 is mounted in translation in relation to the side wall 6 (i.e., in the example illustrated, in relation to each half-mold 5A, 5B) along a transverse axis T (this axis can be seen in FIGS. 3 and 4) between a retracted position (illustrated in FIG. 1, FIG. 2, FIG. 3) in which the insert 12 is at least partially retracted into the housing 9, and a deployed position (illustrated in FIG. 4) in which the insert 12 projects at least partially into the cavity 7 outside of the housing 9.

Figure 3:
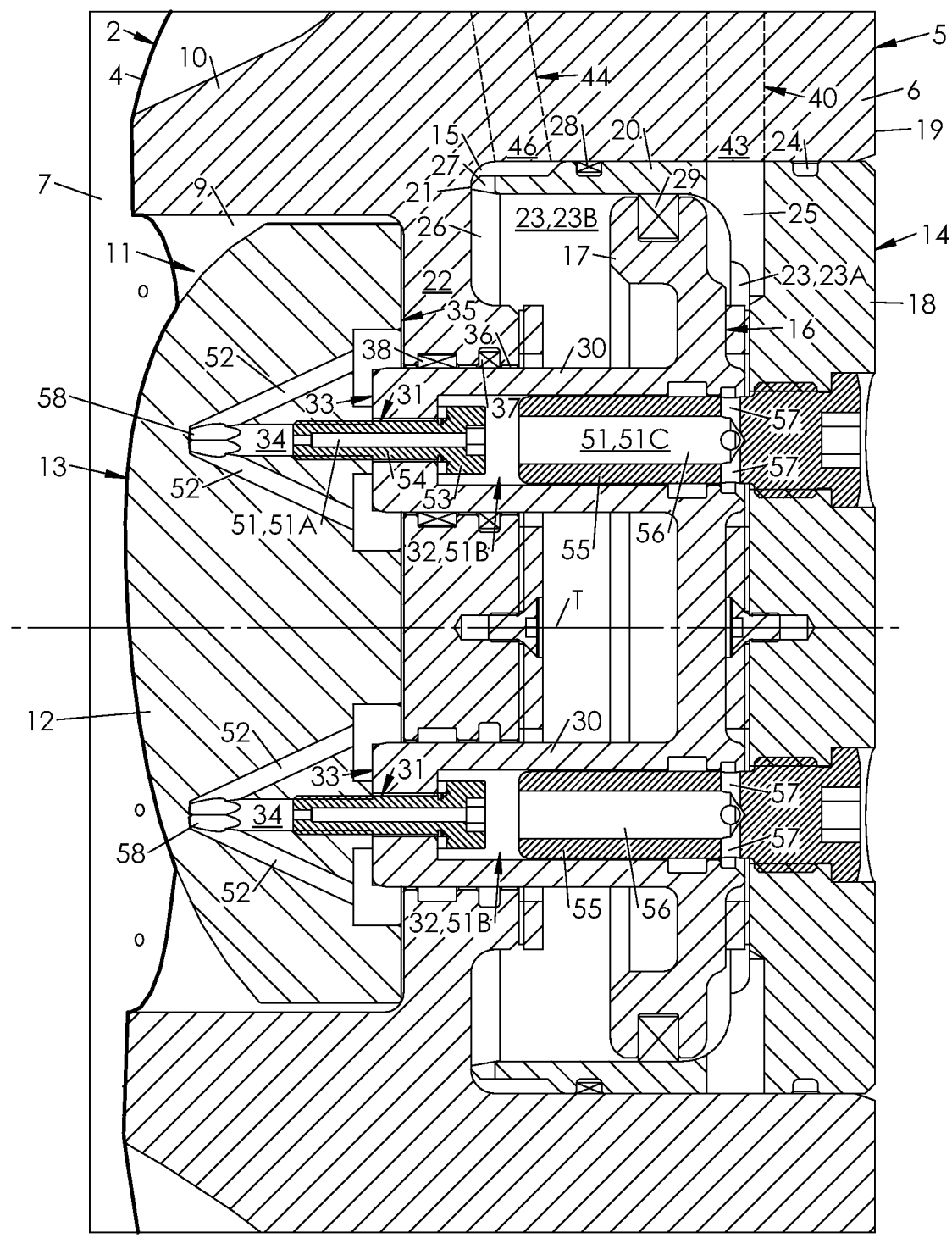
FIG. 3 is a view of a detail, on a larger scale, of the molding unit of FIG. 2, delimited by the inset III, showing an insert in the retracted position.
Figure 4:
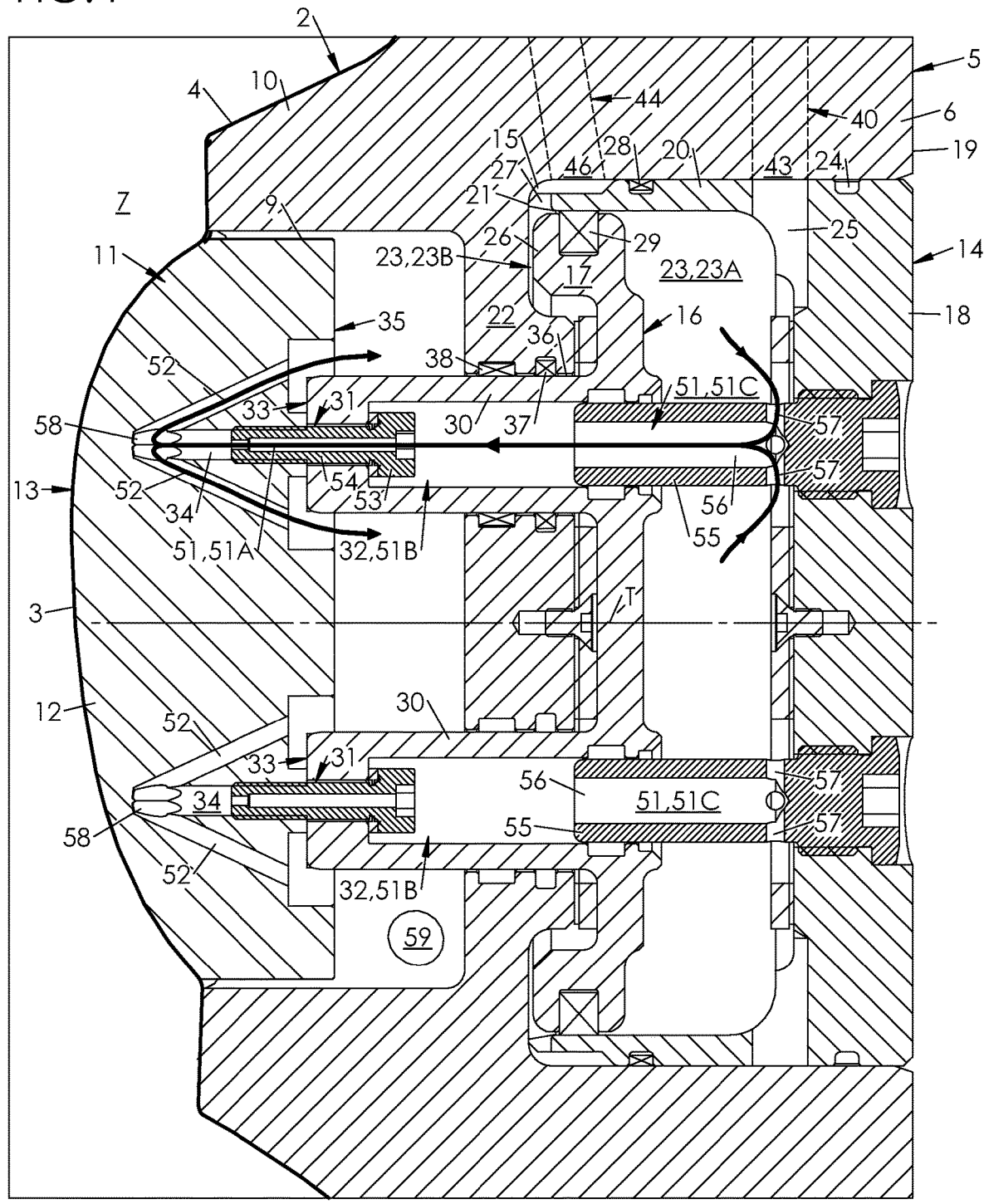
FIG. 4 is a view similar to FIG. 3, showing the insert in the deployed position.

More specifically, and as FIG. 3 clearly shows, in the retracted position of the insert 12, the frontal surface 13 is included in the housing 9 and does not go beyond the protrusion 10, whereas in the deployed position of the insert 12, and as FIG. 4 clearly shows, the frontal surface 13 projects into the cavity 7 and extends into the extension of the protrusion 10 to complete with the latter the impression of the recess 3 formed as a cavity in the container 2.

This configuration is not exclusive. Thus, according to another embodiment, in the retracted position of the insert 12, the frontal surface 13 of the insert 12 is set back in relation to the inner edge of the protrusion 10. According to still another embodiment, in the retracted position of the insert 12, the frontal surface 13 of the insert 12 is found in the extension of the inner edge of the protrusion 10.

Figures 5, 6:
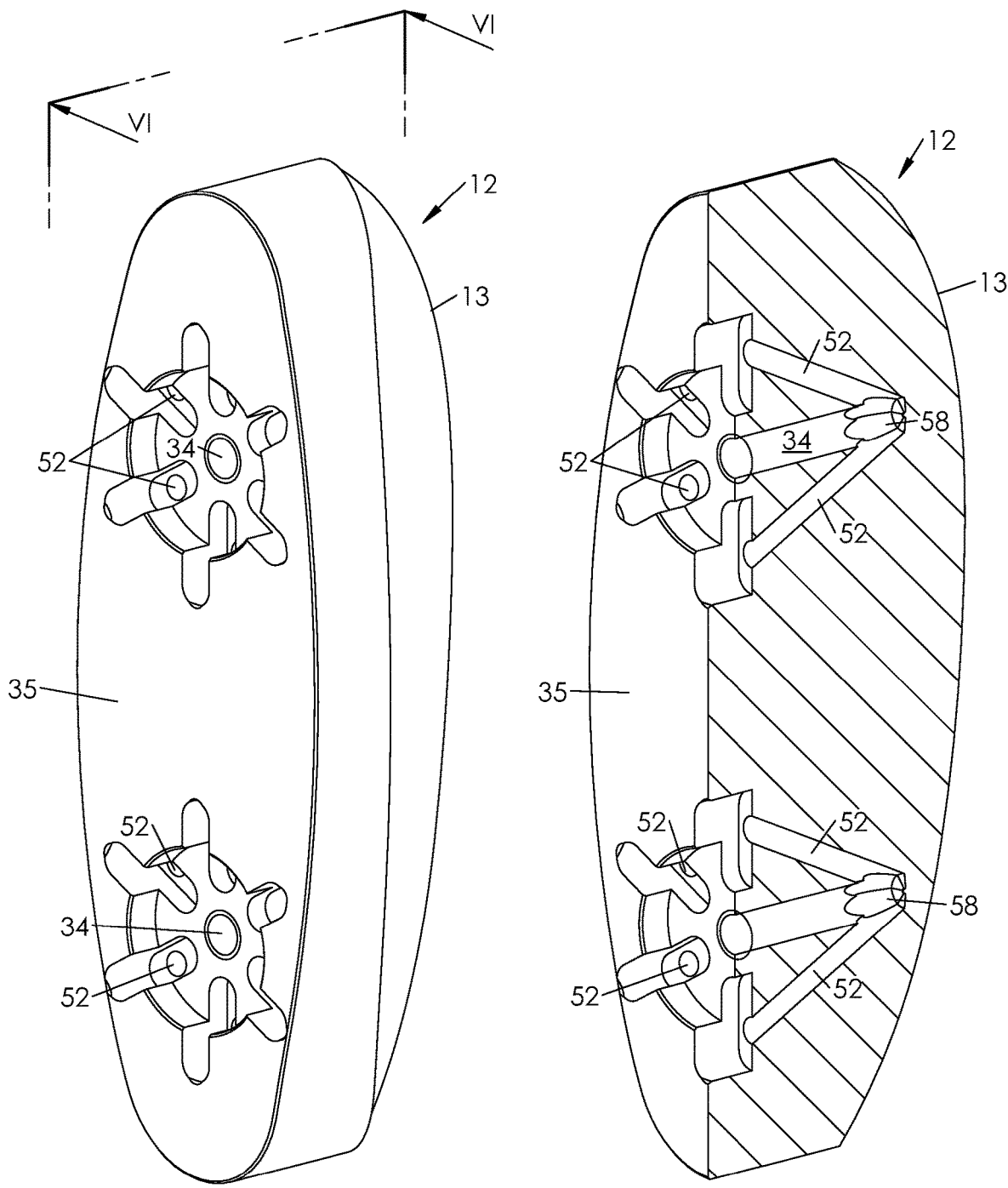
FIG. 5 is a perspective view of the insert, from the side of its rear surface.
FIG. 6 is a perspective view of the insert, cut off by the plane VI-VI of FIG. 5.

As FIG. 5 and FIG. 6 clearly show, the insert 12 (like its housing 9) has an asymmetrical rotational profile around the axis T, which limits the rotation of the insert 12 around the latter. More specifically, the insert 12, preferably, is more tall (along the general axis X of the mold 5) than wide (in a horizontal plane). In the example illustrated, the insert 12 has an oval profile with a long, essentially vertical axis. However, as will be understood from reading the description below, each insert 12 is preferably attached using two screws, which limits even more its possibilities of rotation around the axis T.

As illustrated in the drawings, each boxing device 11 further comprises an added sleeve 14, mounted in a hollowed-out complementary recess 15 in the side wall 6 (i.e., in the example illustrated, in each half-mold 5A, 5B) and attached to the latter. The sleeve 14 is advantageously made of steel.

Each boxing device 11 further comprises an actuator 16 that is integral with the insert 12 to move the latter from its retracted position to its deployed position, and vice versa, and comprising for this purpose a piston 17 mounted in translation in the sleeve 14. The actuator 16 is preferably made of aluminum.

According to an embodiment illustrated in the drawings, and more particularly visible in FIG. 3 and FIG. 4, the sleeve 14 comprises a bottom wall 18 that, when the sleeve 14 is inserted into its recess 15, is flush with an outer surface 19 of the mold 5, and a cylinder 20 that projects transversely from the bottom wall 18 and ends by an edge 21 opposite a bottom wall 22 of the recess 15, which separates the latter from the hollow recess 3.

Together, the sleeve 14 and the bottom wall 22 delimit a chamber 23 in which the piston 17 moves.

The piston 17 subdivides the chamber 23 into a so-called primary rear chamber 23A and a so-called secondary front chamber 23B. In the example illustrated, the primary chamber 23A is limited on the inside by the piston 17 and on the outside by the bottom wall 18 of the sleeve 14. Furthermore, in the example illustrated, the secondary chamber 23B is limited on the outside by the piston 17 and on the inside by the bottom wall 22 of the recess 15.

The sleeve 14 is provided, on an outer peripheral surface of the cylinder 20, with a rear groove 24 that is designed to accommodate a sealing joint. The cylinder 20 is also penetrated by at least one rear opening 25 (here in the form of a hole) opening into the primary chamber 23A.

The sleeve 14 is further provided, on the outer peripheral surface of the cylinder 20, with a front groove 26 that opens into the secondary chamber 23B by at least one notch 27 made in the edge 21.

A joint 28 is mounted on the outer surface of the cylinder 20 by being compressed between the latter and the recess 15.

A connected peripheral segment 29 is mounted on the outer surface of the piston. The segment 29 is advantageously made in a material with a low friction coefficient, for example bronze, or, preferably, composite material, such as polytetrafluoroethylene (PTFE).

The joint 28 (fixed) and the segment 29 (movable) together ensure the sealing of the chambers 23A, 23B in relation to one another.

After its insertion into the recess 15, the sleeve 14 is attached to the side wall 6 of the mold 5.

According to an embodiment illustrated in the figures, the actuator 16 comprises at least one gun 30 that extends radially projecting from the piston 17, and to which the insert 12 is attached by means of a screw 31. In the preferred embodiment, as illustrated in the figures, two superposed guns 30 are provided, which extend radially projecting from the piston 17, and on which the insert 12 is attached by means of two respective screws 31.

This arrangement with two attachment elements (the two screws 31) contributes to preventing the rotation of the insert 12 in its housing 9 around the above-mentioned axis T and prevents premature wear of the insert 12 by friction against the side wall of the housing during its multiple movements. Actually, in such a case, play can be provided between the insert 12 and the housing 9 so as to prevent contact.

As illustrated in FIG. 3 and FIG. 4, the or each gun 30 is hollow and comprises a central well 32. The insert 12 is attached to a distal end 33 of the or each gun 30, opposite to the piston 17.

More specifically, in the example illustrated, the insert 12 is attached to the or each gun 30 by means of a screw 31 that passes through the distal end 33 of the gun 30 and that engages helically with a threaded hole 34 made in a rear surface 35 of the insert 12, opposite to the frontal surface 13 (and rotated toward the piston 17).

As FIG. 3 and FIG. 4 show, the or each gun 30 is mounted to slide in a through hole 36, made in the bottom wall 22 of the recess 15.

One or more sealing joints 37 (preferably with lips) isolate the secondary chamber 23B from the housing 9, and preferably also one or more guide rings 38 (for example, made of polytetrafluorethylene or PTFE) is/are inserted between the or each through hole 36 and the or each corresponding gun 30.

Each boxing device 11 comprises a fluid circuit 39 for controlling the movement of the piston 17, at least from its retracted position to its deployed position. According to an advantageous embodiment, the fluid circuit 39 is pneumatic, with the fluid used being a gas (typically air) under pressure.

For this purpose, the fluid circuit 39 comprises at least one primary fluid conduit 40 for supplying the primary chamber 23A, which communicates with the latter via the rear opening 25.

In practice, and as illustrated in dotted lines in FIG. 2, the primary fluid conduit 40 is penetrated in the mold 5 and empties, via an upstream end 41, onto an upper surface 42 of the mold 5, and, via a downstream end 43, into the recess 15 at the rear opening 25 (FIG. 2).

According to an embodiment illustrated in the drawings, controlling the movement of the piston 17 is of the dual action type, with the fluid circuit 39 being configured to control the movement of the corresponding piston 17 also from its deployed position to its retracted position.

For this purpose, the fluid circuit 39 comprises a secondary fluid conduit 44 for supplying the secondary chamber 23B, which communicates with the latter via the notch 27.

In practice, and as illustrated in dotted lines in FIG. 2, the secondary fluid conduit 44 is penetrated in the mold 5 and empties, via an upstream end 45, onto the upper surface 42 of the mold 5, and, via a downstream end 46, into the recess 15 at right angles to the front groove 26.

As FIG. 1 shows, the molding unit 1 comprises a pneumatic connector 47 for supplying gas at least from the primary fluid conduit 40. For this purpose, the pneumatic connector 47 comprises a primary intake 48 in communication with the upstream end 41 of the primary fluid conduit 40.

The primary intake 48 is connected to a source of gas at high pressure, advantageously greater than 20 bar (and, for example, about 40 bar). The source of gas at high pressure is, for example, the source used to carry out the blow molding of the container 2.

In the example illustrated, where controlling the movement of the piston 17 is dual action, and where, apart from the primary fluid conduit 40, the fluid circuit 39 comprises a secondary fluid conduit 44 for supplying the secondary chamber 23B, the pneumatic connector 47 comprises a secondary intake 49 in communication with the upstream end 45 of the secondary fluid conduit 44.

The secondary intake 49 is connected to a source of gas having comparatively lower pressure, advantageously less than or equal to 12 bar (and, for example, about 7 bar). This source of gas with comparatively lower pressure is, for example, the source used to carry out the pre-blow molding of the container 2.

The upstream ends 41, 45 of the conduits 40, 44 advantageously come out near one another, so as to enable their common connection to the respective sources of pressurized gas via a single pneumatic connector 47 mounted on the upper surface 42 of the mold 5, as illustrated in FIG. 1.

The molding unit 1 comprises a fluid circuit for thermal regulation of the wall 6, in which a coolant (preferably a liquid, for example water or oil) circulates. This circuit is provided to maintain the temperature of the wall 6 at an approximately constant temperature, either low (typically on the order of 10° C.) to ensure a cooling of the container 2 only just formed, or high (typically on the order of 120° C.) to ensure a heat setting of the container 2 and thus to increase, by thermal means, its crystallinity (and therefore its mechanical strength). This fluid circuit includes, for example, ducts that penetrate into the wall 6 of the mold 5. These ducts (not shown in the drawings due to the cutaway plane selected) communicate with one or more connectors 50 to which are connected circuits for supplying and evacuating coolant (FIG. 1).

This fluid circuit ensures the thermal regulation of the wall of the mold, but it is not able to ensure that of the inserts, which come into contact, however, with the material of the container 2 and that, in the absence of cooling, would have a tendency to overheat and to prevent the setting of the material.

This is why each insert 12 is the object of thermal regulation separated from that of the wall 6. As illustrated in the drawings, and more particularly in FIG. 3 to FIG. 6, each insert 12 is penetrated by ducts 52.

These ducts 52 are in communication with the primary chamber 23A by means of a fluid circuit 51, also called a regulation fluid circuit. This fluid circuit 51 comprises at least:

A first section 51A made in the or each screw 31 and that communicates with the ducts 52 of the insert 12,
A second section 51B made in the piston 17 and that communicates with the first section 51A.

Conventionally, the screw 31 comprises a head 53 provided with a complementary impression of a screwing tool (for example, an Allen key) and a threaded body 54.

As the drawings show, and more particularly FIG. 3 and FIG. 4, the or each screw 31 is penetrated by a central bore that passes right through it and forms the first section 51A of the fluid circuit 51.

Thus, in the example illustrated, the central bore that forms the first section 51A of the screw 31 empties, from one side (on the piston 17 side), into the impression of the head 53, and, on the opposite side (on the insert 12 side), into one end of the body 54.

Furthermore, as illustrated in particular in FIG. 3 and FIG. 4, the or each gun 30 is advantageously hollow and comprises a central well that forms the second section 51B of the fluid circuit 51.

According to a preferred embodiment illustrated in the drawings, and more particularly in FIG. 3 and FIG. 4, the molding unit 1 comprises at least one rod 55 for guiding the piston 17, on which the latter is mounted to slide. Preferably, a respective guide rod 55 is combined with each gun 30, which also, moreover, promotes the anti-rotational effect of the insert 12.

More specifically, and as illustrated, the or each rod 55 is fitted (while sliding) into the central well 32 of the respective gun 30. This rod 55 is, for example, made of steel, while preferably being coated by a layer of a material with a low friction coefficient and with a high degree of hardness (for example, made of PTFE).

According to a preferred embodiment, the fluid circuit 51 for thermal regulation of the insert 12 comprises a third section 51C, made in the guide rod 55 and that communicates with the second section 51B. In the example illustrated, the third section 51C comprises a central bore 56 made in the guide rod 55, and radial holes 57 that open, on the one hand, into the primary chamber 23A, and, on the other hand, into the central bore 56 to put them into communication. As FIG. 3 and FIG. 4 show, the central bore 56 opens into the central well 32 of the gun 30.

As FIG. 5 and FIG. 6 clearly show, the ducts 52 advantageously empty onto the rear surface 35 of the insert 12.

As illustrated in FIG. 3 and FIG. 4, and as can be better seen in FIG. 6, each insert 12 comprises a number of ducts 52 that diverge from a common vertex 58 and are distributed along a cone. More specifically, and as the drawings show, the common vertex 58 is merged with an inner end of the threaded hole 34 in which the screw 31 is housed.

To form a container 2, the procedure is as follows.

The first step is to introduce into the mold 5, in its open position, a blank previously heated to a temperature that exceeds the glass transition temperature of its material (typically, a blank made of PET, whose glass transition temperature is on the order of 80° C., is heated to a temperature of about 120° C.). Each insert 12 is then in its retracted position.

The mold 5 is then closed, and a fluid (in particular air) under pressure (for example from about 7 to 15 bar) is injected into the blank, which is, preferably, simultaneously stretched by means of a sliding rod. Under the pressure, the material of the blank is brought into the vicinity of the side wall 6 and of the mold bottom 8, without, however, being brought into contact with it.

Each insert 12 is then moved toward its deployed position. For this purpose, a pressurized fluid (here, air at a high pressure, greater than or equal to 20 bar and typically on the order of 40 bar) is injected, via the primary fluid conduit 40 and the rear opening 25, into the primary chamber 23A, while the fluid present in the secondary chamber 23B is simultaneously evacuated, via the notch 27, and the front groove 26, through the secondary fluid conduit 44. Under the pressure difference between the primary chamber 23A and the secondary chamber 23B, the piston 17 is, with the insert 12 with which it is integral, moved transversely in the direction of the cavity 7, until striking against the wall 22, which thus determines the end of travel of the insert 12 in the deployed position.

The insert 12 pushes the material back like a plunger (without, however, puncturing it) until reaching its deployed position, with the handle then being formed as a cavity in the body 4 of the container 2 (FIG. 4).

As illustrated above in FIG. 4, the pressurized fluid that serves to move the piston 17 (and with it the insert 12) is employed to regulate the insert 12 thermally. It is actually seen that the pressurized fluid that is present in the primary chamber 23A is drawn in toward the housing 9 by the partial vacuum that is created in the latter during the movement of the insert 12 toward its deployed position. The fluid circulates then in the fluid circuit 51 for purposes of regulation, as indicated by the black arrows. More specifically, the fluid passes through the radial holes 57, then through the bore 56; it then circulates in the well 32, disappears into the first section 51A (the bore) of the screw through which it passes before reaching the threaded hole 34 and then the ducts 52 through which it passes before coming out from the side of the rear surface 35 of the insert 12, then emptying into the housing 9.

So as to optimize the circulation making possible the thermal regulation of the insert 12, according to a preferred embodiment illustrated in FIG. 4, a degassing vent 59 is made in the side wall 6 of the mold 5 to put the housing 9 into communication with the open air. The presence of the vent 59 makes it possible to exhaust the air contained in the housing 9 during the blow-molding phases (when the air is injected to push the piston) and brings about a circulation of air around the insert 12.

The result is an effective thermal regulation of the insert 12, helping to cool the material of the container 2 upon contact with the insert 12. In this way, the setting of the material is brought about, which improves the impression-taking.

It was noted that the forced cooling of the insert 12, owing to the circulation of air around and inside the insert 12, made it possible to obtain cooling levels of the areas in contact with the insert 12, such as the hollow recesses 3, which are never reached until then. The temperature of these areas winds up dropping far below the glass transition temperature (also called TG or softening temperature) of the constituent material of the container: to provide an order of magnitude, with PET whose glass transition temperature is on the order of 70° C. and the temperature to which the material is brought for the formation of the container is on the order of 110° C., the cooling of the insert 12 makes it possible to drop the temperature of these areas to 60° C. or less, or a reduction in temperature of more than 50° C.

After a time lag (of several tenths of seconds), the container is degassed, the insert 12 is put back into in its retracted position, then the mold 5 is opened, and the container 2 is removed from the mold 5.

So as to put the insert 12 back into its retracted position, the pressurized fluid is injected into the secondary chamber 23B, via the secondary conduit 44, the front groove 26, and the notch 27, while the fluid that is present in the primary chamber 23A is simultaneously evacuated, via the rear opening 25, through the primary fluid conduit 40. Because of the difference in pressure between the secondary chamber 23B and the primary chamber 23A, the piston 17 is, with the insert 12 with which it is integral, moved transversely toward the exterior of the mold 5 until striking against the bottom wall 18, which determines the end of travel of the insert 12 in the retracted position.

The fact of using the pressurization fluid of the primary chamber 23A for regulating the insert 12 thermally also makes it possible to eliminate a system for controlling the flow rate (for example, a solenoid valve) associated with the fluid circuit 51 for regulation, since the latter is supplied only when the movement of the piston 17 (i.e., the insert 12) is controlled.

The fact of using structural parts (screw 31, gun(s) 30, rod(s) 55) also makes possible a substantial increase of space (no connected conduit for channeling fluid is necessary), helping to make the molding unit 1 compact. It is also conceivable to optimize the consumption of air by adjusting the diameters of the holes passing through the screws, and even by having different diameters from one hole to the next or else by having holes of non-constant diameters.

The invention claimed is:

1. A molding unit (1) for the forming of a container (2), with this forming unit (1) comprising:
a mold (5) provided with a side wall (6) defining a cavity (7) bearing the impression of a portion of the container (2);
an insert (12) having a frontal surface (13) bearing the impression of a local portion of the container (2), movable between a retracted position and a deployed position, with this insert (12) being penetrated by ducts (52);
a piston (17) to which the insert (12) is attached and which ensures the mobility of the latter between its retracted position and its deployed position, with this piston (17) itself being mounted in translation in a recess (15) hollowed into the side wall (6), with the piston (17) defining a primary chamber (23A) located beside the piston (17) that is opposite to the insert (12) and into which at least one conduit (44) for intake of a pressurized fluid, made in the side wall (6), empties;
at least one screw (31) by which the insert (12) is attached to the piston (17);
wherein the ducts (52) of the insert (12) are in fluid communication with the primary chamber (23A) by means of a fluid circuit (51) that comprises at least a first section (51A) made in the screw (31) and that communicates with the ducts (52) of the insert (12), and a second section (51B) made in the piston (17), which communicates with the first section (51A).

2. The molding unit (1) according to claim 1, wherein the screw (31) for attaching the insert (12) is penetrated by a central bore that passes right through it and forms the first section (51A) of the fluid circuit (51).

3. The molding unit (1) according to claim 1, wherein the piston (17) is provided with at least one projecting gun (30), on which the insert (12) is attached by the screw (31), this gun (30) being hollow and comprising a central well (32) that forms the second section (51B) of the fluid circuit (51).

4. The molding unit (1) according to claim 1, further comprising at least one rod (55) for guiding the piston (17), on which the latter is mounted to slide.

5. The molding unit (1) according to claim 4, wherein the fluid circuit (51) comprises a third section (51C) made in the guide rod (55), which communicates with the second section (51B).

6. The molding unit (1) according to claim 5, wherein the third section (51C) of the fluid circuit (51) comprises a central bore (56) made in the guide rod (55), and radial holes (57) that open both into the primary chamber (23A) as well as into the central bore (56).

7. The molding unit (1) according to claim 3, combined, wherein the guide rod (55) is fitted into the gun (30), with a central bore (56) of the guide rod opening into the central well (32) of the gun.

8. The molding unit (1) according to claim 4, wherein the guide rod (55) is mounted on a connected sleeve (14) fitted into the recess (15), in which the piston (17) is mounted in translation, and with which the piston (17) defines the primary chamber (23A).

9. The molding unit (1) according to claim 1, wherein the ducts (52) open onto a rear surface (35) of the insert (12), rotated on the side of the piston (17).

10. The molding unit (1) according to claim 9, wherein the insert (12) comprises a number of ducts (52) that diverge from a common vertex (58) and are distributed along a cone.

11. The molding unit (1) according to claim 2, wherein the piston (17) is provided with at least one projecting gun (30), on which the insert (12) is attached by the screw (31), this gun (30) being hollow and comprising a central well (32) that forms the second section (51B) of the fluid circuit (51).

12. The molding unit (1) according to claim 2, further comprising at least one rod (55) for guiding the piston (17), on which the latter is mounted to slide.

13. The molding unit (1) according to claim 3, further comprising at least one rod (55) for guiding the piston (17), on which the latter is mounted to slide.

14. The molding unit (1) according to claim 5, wherein the guide rod (55) is mounted on a connected sleeve (14) fitted into the recess (15), in which the piston (17) is mounted in translation, and with which the piston (17) defines the primary chamber (23A).

15. The molding unit (1) according to claim 6, wherein the guide rod (55) is mounted on a connected sleeve (14) fitted into the recess (15), in which the piston (17) is mounted in translation, and with which the piston (17) defines the primary chamber (23A).

16. The molding unit (1) according to claim 7, wherein the guide rod (55) is mounted on a connected sleeve (14) fitted into the recess (15), in which the piston (17) is mounted in translation, and with which the piston (17) defines the primary chamber (23A).

17. The molding unit (1) according to claim 2, wherein the ducts (52) open onto a rear surface (35) of the insert (12), rotated on the side of the piston (17).

18. The molding unit (1) according to claim 3, wherein the ducts (52) open onto a rear surface (35) of the insert (12), rotated on the side of the piston (17).

19. The molding unit (1) according to claim 4, wherein the ducts (52) open onto a rear surface (35) of the insert (12), rotated on the side of the piston (17).

20. The molding unit (1) according to claim 5, wherein the ducts (52) open onto a rear surface (35) of the insert (12), rotated on the side of the piston (17).

* * * * *